FIG. 2
FIG. 1
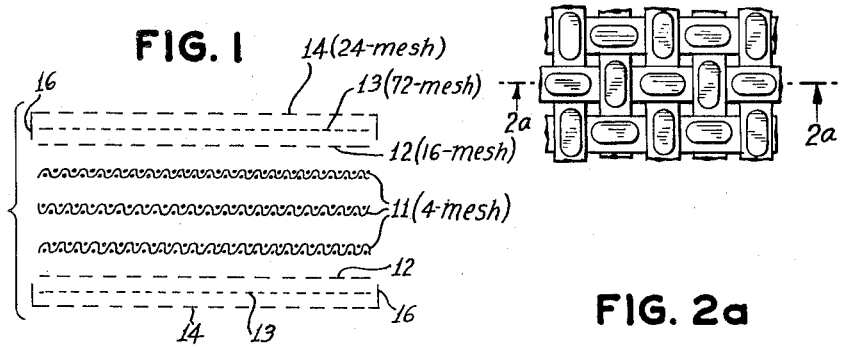
FIG. 2a
FIG. 3
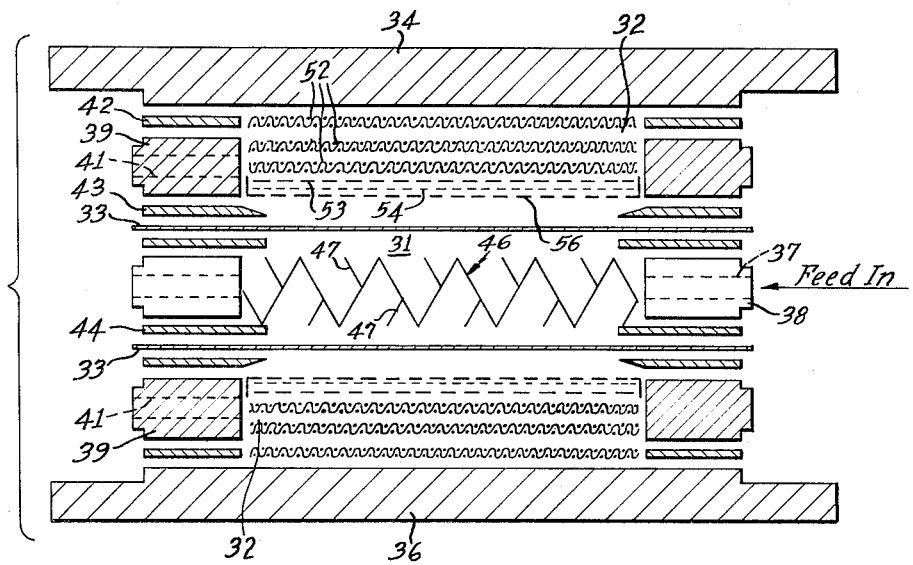
INVENTORS
HEINRICH K. STRASCHIL
THEODORE C. LOPEZ
BY
*Samuel Kahn*
ATTORNEY

3,238,704
DIFFUSION PURIFICATION OF GASES
Heinrich K. Straschil, East Orange, and Theodore C. Lopez, Irvington, N.J., assignors to Engelhard Industries, Inc., Newark, N.J., a corporation of Delaware
Filed Mar. 7, 1963, Ser. No. 263,636
5 Claims. (Cl. 55—158)

This invention relates to diffusion purification of gases and, particularly, to gas purification apparatus utilizing the selective diffusion properties of specific gases and materials employed as diffusion membranes. The invention is especially concerned with an improved apparatus for the separation of a gas from a mixture of gases by means of the selective diffusion of such gas through thin diffusion foils. More specifically, the invention relates to an apparatus for separating hydrogen in a high state of purity, the apparatus involving the use of a baffle for distributing the gaseous feed uniformly across the surface of a metal foil which is selectively permeable to hydrogen, whereby the efficiency of the diffusion apparatus is remarkably improved.

The apparatus for separating hydrogen from gaseous mixtures and purifying hydrogen by permeation through thin non-porous metal barriers of palladium or palladium alloys is well known. A variety of techniques have been hitherto devised for effecting such apparatuses. For example, it is known to use thin tubes of hydrogen-permeable metal as the barrier means, the hydrogen-containing gases being contacted with one side of such tubes and pure diffused hydrogen being removed from the other side. Generally, hydrogen diffusion processes are effected at elevated temperatures and partial pressure conditions which establish a differential across the hydrogen-permeable diffusion barrier.

As an alternative to the use of thin metal tubes for diffusion separation and/or purification of hydrogen, techniques have been devised which employ thin sheets or foils of hydrogen-permeable metal. Procedures and apparatus have been disclosed in the art for positioning or disposing such thin metal films or foils in suitable diffusion apparatus, including means for reinforcing or supporting such thin films and foils so as to make practicable operating pressure differentials across such foils barriers of the order of several hundred pounds per square inch. For example, U.S. Patent No. 1,174,631 of Snelling discloses the use of thin platinum or palladium sheets disposed or supported upon porous backing materials such as porous earthenware or Alundum. Porous backings which are sandwiched between suitable Group VIII metal diffusion barriers are disclosed in U.S. Patent No. 2,958,-391 of A. J. de Rosset.

In general, foil type diffusers are assembled having one or more foils supported by a porous backing and sealed or gasketed around the peripheral edges of the foil to provide a leak-tight structure. Such diffusion apparatus is provided with inlet means for introducing hydrogen-containing feed gases to one side of the permeable foil or barrier, and outlet means for removing pure hydrogen which diffuses through the hydrogen-permeable barrier.

Although foil type diffusers have not been widely used commercially in comparison with tube diffusers, they have important advantages over tube diffusers. One problem in the use of foil-type diffusers is the likelihood of damage to the foils in operation or handling. The present invention provides a superior method for supporting foils to prevent their being damaged in operation.

The advantages of foil over tube diffusers include: (1) The possibility of operation with thinner diffusion membranes than tubes, i.e. 1 mil thickness or even less as compared to reasonable life in the present state of the art only with tubes about 3 mils or more in wall thickness; and (2) more ready disassembly and repair of foil diffusers than tube diffusers, since the former are sealed with gaskets and the latter by welding or brazing. As diffusion is inversely proportional to membrane thickness, use of such thinner foils is superior to use of the thicker tubes in potentially providing, for a given pure gas production, more compact design, and requirement for smaller size of pressure equipment, as well as a major saving of expensive diffusion membrane material such as palladium. Thus, assuming operation at the same pressure differential and temperature, a 1-mil thick foil diffuser requires only about a ninth as much metal as a 3-mil wall tube diffuser.

Foil-type diffusion of the aforementioned type may generally be stated to comprise one or more feed distribution zones, each of which zones is separated from a permeated-gas collection zone by the permeable foil and its supporting structure. The combination of a feed distribution zone, a permeable barrier and a gas collection zone is for purpose hereof referred to as a diffusion cell, and it should be understood that any particular diffusion apparatus may comprise one or more of such cells. The diffusion cell may be of any desired shape, e.g. rectangular or circular in cross section, and gas inlets and outlets can be provided at any convenient position. Generally, the feed distribution zone is provided with gas inlet and gas outlet means suitably arranged so that the hydrogen-containing gas flows under the applied pressure parallel to the diffusion membrane.

In order to effectively employ thin metal foils for diffusion purposes, the art has employed various supports for such foils to lend structural strength sufficient to resist deforming effects of pressure differentials across the foil barrier. Ceramic structures and sintered metals have been employed for this purpose, such materials being porous in structure so as to permit removal of diffused gas from the downstream side of the diffusion barrier. Such supporting materials, however, introduce certain disadvantages in operating diffusion apparatus. Typically, such apparatus is employed at elevated temperatures, e.g. above 450° C., and at such temperatures, diffusion membranes composed of palladium or its alloys dilate on exposure to hydrogen and contract on removing the hydrogen (in addition to normal thermal expansion and contraction). Because of the intermittent thermal expansion and contraction of the foil encountered in normal operation of the apparatus, it has been suggested that a support having a thermal coefficient of expansion sufficiently similar to the foil material be used to avoid separation of the foil from the support, with resultant wrinkling and cracking of the foil. It is however virtually impossible to compensate for the dilation effect due to $H_2$ absorption, employing conventional or known supports; as a result thin foils have extremely short life under actual use conditions.

The present invention provides a means for separating hydrogen by gaseous diffusion through thin non-porous, $H_2$ permeable membranes such as palladium, palladium-silver and/or other palladium alloys. In accordance with one embodiment of the present invention, a rigid, porous structural support, at least a part of which consists of a mesh member in partial contact with thin hydrogen permeable foil, is employed to support such thin foil, the resultant structure being of substantial thickness and capable of withstanding the elevated operating pressures applied to the upstream side of the membrane. Preferably the mesh member is a woven metal wire screen, e.g., 24 mesh size and rolled on the side toward the foil. However, a dimpled plate, e.g., of metal, which has perforated or porous openings is also suitable. Thus the invention broadly contemplates the use of a support structure having a surface in contact with the non-porous membrane comprising a network of depressions into which the membrane is depressed under pressure. The surfaces in contact with the foil should be so prepared that sharp edges and protruding parts are minimized. Such dimpled indentations in the plate surfaces contacting the foil or such spaces between the contacting screen wires serve the purpose of making possible foil expansion and contraction as hydrogen is sorbed and desorbed at elevated temperature, without the tearing or wrinkling to which thin foils are otherwise liable. The lengths and widths of such dimples are preferably both between about $1/100''$ and about $1/16''$.

Surprisingly, it has been found that the utilization of such mesh member e.g. a woven wire screen or dimpled porous plate of certain critical mesh size, serves as a die into which the thin foil member is pressed during operation at elevated pressure. The foil while maintaining its general shape, thus assumes a dimpled appearance in contact with the mesh support, and each of the dimples in the surface of the coil appears capable of undergoing the slight stretching and contracting due to thermal and $H_2$ absorptive effects without parting from the screen surface. As a result, wrinkling and cracking of the foil are eliminated, and the foil has long life under repeated diffusion operations.

The said mesh member which is contacted on one side by thin hydrogen permeable foil is supported on the other side by a rigid porous or perforated structure which permits gas flow. Such rigid structure may consist of a variety of alternate members. For example, the rigid supporting structure may consist of sandwiched layers of metal mesh. Another example consists of a laterally perforated honeycombed structure which may be used in combination with intermediate screen, e.g. of 16 and 72 mesh.

An embodiment of the invention which uses the sandwiched layers of mesh is fabricated from one or more coarse metal screens in contact with one side of a finer metal mesh member which in turn is in contact with hydrogen permeable foil.

It has been found that the mesh size of the mesh member is somewhat critical, since when the support screen openings are too small, the foil wrinkles and breaks during operation. At pressures of 25–250 p.s.i., a supporting screen of 16–32 mesh, preferably about 24 mesh, can be used in a weave which will provide from 30–60% open area. Preferably, a weave providing 40–50% open area is used. Surprisingly, it has been found that the use of screen of the indicated mesh size produces a dimpling effect as the foil is pressed against the support, and that hydrogen sorbed by the foil, while normally causing expansion and cracking of the foil, causes expansion of the dimples in the foil without breakage. In a preferred embodiment of the invention, the foil-supporting side of the mesh is flattened, as by rolling, to avoid sharp creases in the foil at the top of each wire of the mesh.

The porous support structure of the sandwiched layer modification of this invention is fabricated from one or more coarse mesh metal screens, e.g., a 3–6 mesh screen which, in the event more than one screen is employed, are superimposed upon each other, the mesh layers being wired or brazed together to form a rigid supporting structure. The coarse mesh screen is fabricated from wire of about 0.1 to 0.2 inch diameter, in order to provide necessary rigidity when subjected to pressures of the order of 25–250 p.s.i. The coarse mesh screen provides a simple, strong and effective 3 dimensional channel system providing a porous network through which diffused hydrogen readily flows on the downstream side of the foil barrier.

In assembling the metal mesh support of the present invention, it has been found advantageous to interpose a fine mesh backing screen of 60–80 mesh, e.g. of 72 mesh, between the somewhat coarser surface mesh and the coarse supporting mesh. Such a fine mesh screen provides a further cushioning effect at the bottom of the dimples formed in the metal foil, and further prolongs the life of the diffusion foil.

In order to avoid deformation under pressure of the fine mesh screen, where such is employed, it is further advantageous to interpose a screen of intermediate size, e.g. 16–24 mesh, between the coarse mesh core and the fine mesh backing screen. Thus, in a preferred embodiment, the support of the present invention comprises a sandwich structure of metal screens of graduated mesh size, the actual supporting surface being a screen of 16–32 mesh, the specific mesh size being dependent upon the operating pressure of the diffusion cell.

Referring to FIGURE 1, there is shown an exploded view of a stainless steel wire screen support pad of the type described above. In the embodiment shown, three wire mesh members 11, of 4-mesh stainless steel wire form the main supporting structure. Optionally, a somewhat finer mesh screen 12, of 16-mesh, is provided as a support for a very fine mesh member 13, of about 72 mesh. Preferably these members are rolled to provide flattened surfaces. Upon fine mesh member 13 is supported a half-rolled and cup-shaped mesh member 14, of 16–32 mesh, preferably 24 mesh as shown in FIGURE 1. The diffusion foil is directly supported upon the flattened surface of this member. In order to avoid damage by the wire, the ends of the mesh are turned down as shown at 16. The support is disposed in the chamber in direct contact with the inside wall and level with the sealing surface of steel ring 39 in such manner as to minimize any gap between the ring and support pad.

The surface of screen 14 is shown in detail in FIGURES 2 and 2a, the flattening being obtained, for example, by passing the screen, together with a soft gasketing material on one side thereof, through a two-roll mill under adequate pressure to obtain the desired flattening. The entire assembly shown in FIGURE 1, suitably assembled into a rigid assembly as by brazing, welding or wiring the supporting screens to each other, is inserted into the diffused-gas collection zone of a diffusion cell.

In practice, the metal mesh support pads described herein are so constructed that they are approximately the same width as the diffused gas collection zone of the diffustion cell. The support pad may be disposed in the collection zone unattached, and fills the chamber completely. Pressure is transferred from the foil membrane to the pad either on one or both sides. In a gas collecting chamber having only one diffusion foil, the pad will of course be in direct contact with an end plate of the apparatus. Obviously if a diffusion foil is used on only one side of a support pad, it is not necessary to have the graduated mesh screens on both sides of the pad. Where desired, the diffused gas collection zone may be made up of foil, support and shell as a removable and replaceable unit, the support pad being permanently attached therein for ease in handling.

In construction of the support pads of the present invention, any suitable metallic or other material may be employed, the only limitation being that the material be sufficiently rigid to maintain its strength and unreactive with hydrogen under the temperature conditions normally employed for diffusion. Thus, suitable screen supports can be fabricated from structural light metal alloys, stainless steel and the like. Stainless steel is preferred, since it is strong, resistant to hydrogen attack, and readily fabricated in the form of a screen. However, a combination of metals may be used, e.g. a stainless steel mesh in contact with foil and a light metal alloy supporting structure. Welding of the foil to the support is undesirable and leads to shorter life of the foil. It may be avoided by coating the metal mesh with a thin layer of non-metallic material. This is preferably done by a pre-oxidizing treatment of the metal in such manner that the non-metallic film will be retained when in contact with hydrogen at operating temperatures. The stainless steel or other metal screens can be coated with protective materials, e.g. refractory coatings such as fused alumina, ceramic, or porcelain, etc.

The screen supports of the present invention can be used to support thin foils of non-porous hydrogen permeable metals for the separation and/or purification of hydrogen in admixture with other gases. It is well known that certain metals of Group VIII of the periodic table are permeable to hydrogen and substantially impermeable to other gases, and any suitable $H_2$ permeable metal known in the art can be used as the diffusion membrane. Thus, palladium, platinum and alloys thereof have been hitherto employed for this purpose. Usually such membranes are from about 0.5 to about 3.0 mil in thickness, and it is preferred to use the thinnest possible membrane in order to maximize the rate of diffusion through the membrane.

Reference is here made to FIGURE 3, which for the purpose of illustration, shows an exploded cross sectional view of a diffusion cell employing one embodiment of the foil described herein. In this figure, a diffusion cell is shown comprising a feed distribution zone 31 and permeated gas collection zones 32, each of which is separated from the feed distribution zone by diffusion membranes 33. End plates 34 and 36, suitably bolted together by bolts (not shown) provide a pressure-tight system, each plate serving as one wall of the aforementioned gas collection zones. Feed gas is introduced into chamber 31 by inlet 37 in stainless steel ring 38. Similar rings 39 provided with $H_2$ outlets 41 serve to define the containing walls of the permeated gas collection zones 32. Each of rings 38 and 39 is in pressure-tight relationship to the end plates 34 and 36, and foils 33, the pressure seal being provided by copper gaskets, shown for example as 42, 43 and 44. In the embodiment shown, gasket 42 is .025" copper ring, gasket 43 is .005" thickness and gasket 44 is .010" thickness, but the particular thickness is not critical, and any suitable gasketing materials may be employed for the purpose.

As shown in FIGURE 3, gasket 44 is of slightly larger width than the wall of ring 38, and thus provides a support for baffle plate 46 disposed within chamber 31 and resting upon the surface of gasket 44. Baffle 46 comprises a corrugated plate provided with a series of openings on each corrugation, each opening having associated therewith a deflector 47. The baffle plate is employed in the feed distribution zone to provide thorough mixing of gas in this zone, as well as to channel flow of gas into contact with, and across the surface of, the diffusion foils 33. By use of such baffle means, substantially theoretical efficiency of the diffusion membrane for separation of hydrogen is attained, as more fully described in our copending application Ser. No. 263,365, filed Mar. 7, 1963.

In the construction of the diffusion cell, it has been found advantageous to avoid the sharp edge of the gasketing material at the surface of the thin membrane, particularly on the downstream side of the membrane. The presence of such a sharp edge has a cutting effect on the membrane, and is often found to result in tearing of the membrane. Consequently, gasket 43, as shown in FIGURE 3, is preferably feathered to a fine edge to provide a seal resistant to tearing.

Within diffused gas collection zone 32, a support pad 51 is disposed, consisting of the composite sandwich structure as described in connection with FIGURE 1 hereof. In this embodiment, the support pad 51 consisted of three central wire mesh members of 4-mesh stainless steel 52, a finer screen of 16-mesh, 53, and a very fine screen of 72-mesh, 54. The diffusion foil was directly supported on a 24-mesh screen 56 having turned down edges, and previously flattened on one side.

The support pad was of such dimensions as to provide a snug fit in zone 32 so that, under pressure, the foil 33 was supported by mesh member 56 with minimum displacement from its initial position. Under pressure, foil 33 is pressed into close contact with the mesh support, and the resultant dimpled surface of the foil is extremely resistant to wrinkling or tearing.

A diffusion cell as described in connection with FIGURE 3 hereof was employed for the separation of hydrogen from a mixture of hydrogen and nitrogen containing 50% $H_2$. After continuous operation for 15 days at 500° C., using pressures from 50 to 120 p.s.i. on the upstream side, the diffusion cell was dismantled and the foils examined. The foils were found to be dimpled, but blemish-free. No perforations, cracks, or wrinkles were observed.

What is claimed is:

1. An apparatus for separating hydrogen from a mixture of gases containing hydrogen which comprises in combination a diffusion cell consisting of an inlet chamber and a diffused gas chamber, said chambers being separated by a non-porous hydrogen-permeable membrane composed of a material selected from the group consisting of palladium and palladium alloys supported by a metal mesh sandwich structure within said diffused gas chamber, said structure comprising at least one inner coarse mesh screen, an intermediate fine mesh screen and an outer coarse mesh screen of 16–32 mesh having from 30 to 60% open area, said inlet chamber containing an inlet for said gaseous mixture, an outlet for non-permeated gases in said mixture and said diffused gas chamber containing an outlet for permeated hydrogen.

2. Apparatus of claim 1 further characterized in that the inner coarse screen is 3 to 6 mesh and the intermediate fine screen is 60 to 80 mesh.

3. Apparatus of claim 1 further characterized in that an additional screen of mesh size between that of the inner coarse screen and that of the intermediate screen is interposed between said inner coarse and intermediate screens.

4. Apparatus of claim 3 where said additional screen is of 16 to 24 mesh.

5. Apparatus of claim 1 wherein the screen supports are made of stainless steel.

References Cited by the Examiner

UNITED STATES PATENTS

| | | | |
|---|---|---|---|
| 2,540,152 | 2/1951 | Weller | 55—16 |
| 2,609,059 | 9/1952 | Benedict | 55—16 |
| 2,627,933 | 2/1953 | Teter | 55—158 |
| 2,641,364 | 6/1953 | Depallens | 55—503 X |
| 2,824,620 | 2/1958 | De Rosset | 55—16 |
| 2,980,532 | 4/1961 | Martensson et al. | 55—16 X |

FOREIGN PATENTS 1,257,087  2/1961  France.

REUBEN FRIEDMAN, *Primary Examiner.*